United States Patent [19]

Greiner et al.

[11] Patent Number: 4,795,097

[45] Date of Patent: Jan. 3, 1989

[54] ELECTROMAGNETICALLY ACTUATABLE FUEL INJECTION VALVE

[75] Inventors: Max Greiner, Gerlingen; Udo Hafner, Lorch; Waldemar Hans, Bamberg; Heinrich Knapp, Leonberg; Wolfgang Kramer, Kemmern; Rudolf Krauss, Stuttgart; Ferdinand Reiter, Markgroningen; Peter Romann, Stuttgart; Rudolf Sauer, Benningen, all of Fed. Rep. of Germany

[73] Assignee: Robert Bosch GmbH, Stuttgart, Fed. Rep. of Germany

[21] Appl. No.: 114,946

[22] Filed: Oct. 30, 1987

[30] Foreign Application Priority Data

Dec. 11, 1986 [DE] Fed. Rep. of Germany ....... 3642310

[51] Int. Cl.⁴ .......................... F16K 31/02; B05B 1/32

[52] U.S. Cl. .................................... 239/585; 239/456; 251/129.15

[58] Field of Search ................................ 239/451–453, 239/456–459, 533.3–533.12, 585; 251/65, 129.15

[56] References Cited

U.S. PATENT DOCUMENTS

| | | | |
|---|---|---|---|
| 4,142,683 | 3/1979 | Casey et al. | 239/585 |
| 4,394,971 | 7/1983 | Gaskell | 239/453 |
| 4,454,990 | 6/1984 | Lewis | 239/585 |
| 4,494,701 | 1/1985 | Hensley et al. | 239/585 |
| 4,653,720 | 3/1987 | Knapp et al. | 239/585 X |
| 4,708,289 | 11/1987 | Szablewski et al. | 239/585 X |

*Primary Examiner*—Andres Kashnikow

*Assistant Examiner*—Mary Beth O. Jones

*Attorney, Agent, or Firm*—Edwin E. Greigg

[57] ABSTRACT

An electromagnetically actuatable fuel injection valve, which serves to supply fuel to a mixture-compressing internal combustion engine having externally supplied ignition. The fuel injection valve includes a valve housing with a mouth piece, in which a valve seat body is disposed, included are two magnet coils, two cores and one armature, which has a spherical guide section and is connected to a valve needle. The spherical guide section is slidably supported with its circumference in a guide bore of the valve seat body and in its stroke movement away from the core is limited by a tapered stop opening which adjoins the guide bore. Radially extending grooves are machined into the wall of the stop opening and are coextensive in the wall of the guide bore, so that the area of contact between the spherical guide section and the stop opening is decreased.

11 Claims, 2 Drawing Sheets

ELECTROMAGNETICALLY ACTUATABLE FUEL INJECTION VALVE

BACKGROUND OF THE INVENTION

The invention is based on an electromagnetically actuatable fuel injection valve as defined hereinafter. A fuel injection valve is already known in which the armature has a spherical guide section so that when the valve is opened it comes to rest with one contact face on a stop opening. This has the disadvantage that when the fuel injection valve closes, there is an undesirably strong tendency to hydraulic and magnetic adhesion at the annular contact face, leading to an undesirable delay in the closing movement.

OBJECT AND SUMMARY OF THE INVENTION

The electromagnetically actuatable fuel injection valve has the advantage over the prior art that by decreasing the area of the contact face between the spherical guide section and the stop opening, hydraulic and magnetic adhesion is also decreased, so that the closure of the fuel injection valve is faster and more precise.

Further improvements to the fuel injection valve defined are attainable by the refinements disclosed herein. It is advantageous to embody the depressions in the stop opening as radially extending grooves spaced apart approximately equally from one another and to extend these grooves in the vicinity of the guide bore such that they penetrate the wall of the valve seat body. The wall of the stop opening can be conical or convex as it extends toward the guide bore. Thus by a convex course of the wall of the stop opening toward the guide opening, there is already the advantage that even over long operation of the fuel injection valve, when the spherical guide section meets the surface of the stop opening, the area of contact between the guide section and the stop opening remains less than if the wall of the stop opening is conical.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
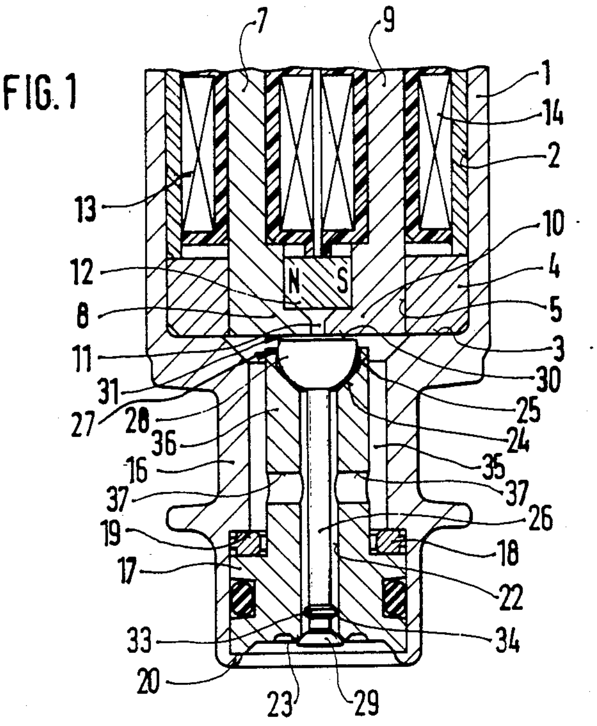
FIG. 1 shows a first exemplary embodiment of a fuel injection valve embodied in accordance with the invention.

The fuel injection valve shown in FIG. 1, for a fuel injection system of a mixture-compressing internal combustion engine having externally supplied ignition, has a valve housing 1, the stepped inner housing bore 2 of which has a first shoulder 3, on which a base plate 4 rests. Protruding into the central recess 5 of the base plate 4 are a first pole piece 7 having a first bent pole 8 and a second pole piece 9 having a second bent pole 10. Between themselves, the poles 8 and 10, oriented toward one another, form a pole air gap 11, which is spanned in part by a permanent magnet 12. Inside the inner housing bore 2, a first magnet coil 13 is disposed on the first pole piece 7 and a second magnet coil 14 is disposed on the second pole piece 9, the coils being located above the poles 8, 10.

Adjacent to the region receiving the magnet coils, the valve housing 1 has a mouth piece 16 of smaller diameter with which the inner housing bore 2 is coextensive and which receives a valve seat body 17, which rests via a shim 18 on a second shoulder 19 of the inner housing bore 2. The rim of the mouth piece 16, in a flanged over portion 20, partly surrounds the valve seat body 17 and presses it toward the second shoulder 19 against the shim 18. In the axial direction, the valve seat body 17 has a through flow bore 22, which discharges outward into a fixed valve seat 23 embodied on the valve seat body 17. Remote from the valve seat 23, the flow bore 22 merges with an oblique stop opening 24, the diameter of which increases in conical fashion up to an adjoining cylindrical guide bore 25. A valve needle 26 passes with play through the flow bore 22, and an armature 27 of ferromagnetic material forms a portion of a guide section 28 which is fixed on one end of the valve needle 26, the armature 27 and guide section 28 are formed in the shape of a portion of a sphere that is slidably supported in the guide bore 25 with little radial play. Remote from the guide section 28, a closing head 29 is embodied on the valve needle 26 and arranged to cooperate with the valve seat 23. The armature has a flattened portion 30 oriented toward the pole pieces 7, 9 acting as a core, and when the magnet coils 13, 14 are not excited, the armature 27 is attracted toward the poles 8, 10 by the permanent magnetic field of the permanent magnet 12, but an air gap 31 remains between the armature and the poles when the closing head 29 is resting on the valve seat 23. It is to be understood that in this position, the spherical guide section 28 has lifted away from the stop opening 24. The radial guidance of the spherical guide section 28 and hence of the armature 27 is effected on the circumference of the guide section, by virtually line contact in the guide bore 25. Directly upstream of the closing head 29, a metering collar 33 is embodied on the valve needle 25, acting with the wall of the flow bore 22 as a throttle restriction for the fuel and forming an annular metering gap 34, at which for example approximately 70% of the fuel pressure, relative to the ambient pressure prevailing downstream of the valve seat 23, drops. The remaining 30% of the fuel pressure relative to the ambient pressure drops at the flow cross section between the valve seat 23 and the closing head 29. Disposing the annular metering gap 34 directly upstream of the valve seat 23 has the advantage that the fuel metering takes place at a location at which the annular metering gap does not become plugged with components of the intake tube atmosphere, such as superfine dust and particles from recirculated exhaust gas, which would cause the metered fuel quantity to vary during operation. The delivery of fuel to the flow bore 22 is effected in an annular conduit 35 between a perforated tubular portion 36 of the valve seat body 17 and the inner housing bore 2, which leads to a fuel delivery connection, not shown, of a fuel feed pump, on the one hand; and on the other hand, the radial bores 37 which lead from the inner bore 2 to the flow bore 22.

As already explained, when the magnet coils 13, 14 are not excited, the armature 27 is attracted by the permanent magnetic field 12 toward the poles 8, 10, thus retaining the closing head 29 on the valve seat 23. Upon excitation of the magnet coils 13, 14, the permanent magnetic flux at the armature 27 is countered by an approximately equal electromagnetic flux, so that the pressure of the fuel engaging the valve needle in the opening direction of the valve is sufficient to lift the closing head 29 from the valve seat 23, and the armature 27 can execute a stroke movement until the guide section 28 comes to rest on the wall of the stop opening 24. The stroke movement of the armature 27 or of the closing head 29 relative to the valve seat 23 can be adjusted in a known manner prior to the mounting of the armature 27 or guide section 28 on the valve needle 26. When the closing head 29 has lifted outward away from the valve seat 23, the fuel flowing to the valve seat 23 at the same time centers the valve needle 26 in the flow bore 22.

Figure 2:
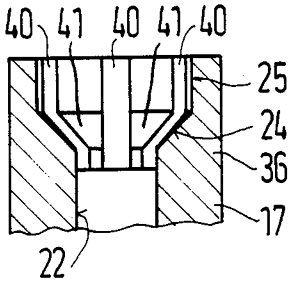
FIG. 2 is a partial side elevational view of a valve seat body embodied according to the invention.
Figure 3:
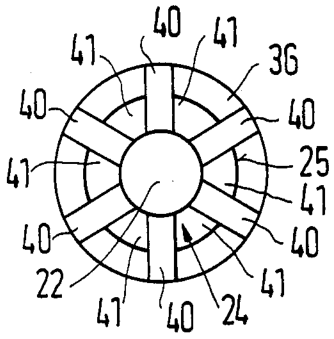
FIG. 3 ia a plan view of the valve seat body shown in FIG. 2.

As shown more clearly in FIGS. 2 and 3, depressions, embodied for example as radially extending grooves 40 spaced apart equally from one another, are machined into the wall of the stop opening 24. The grooves 40 are continued in the wall of the guide bore 25 and advantageously penetrate the wall of the valve seat body 17 radially in the vicinity of the guide bore 24, so that fuel can flow via the grooves 40 to the flow bore 22. The wall of the stop opening 25 is embodied as cylindrical, in the exemplary embodiment of FIGS. 1, 2 and 3. By the disposition of the grooves 40 in the wall of the stop opening 25, the surface which cooperates with the guide section 28 is subdivided into partial faces 41, thereby decreasing the area of contact between the spherical guide section 28 and the stop opening 25 when the guide section 28 is resting on the partial faces 41; this results in a considerable decrease in the tendency to hydraulic and magnetic adhesion, so that the closure of the fuel injection valve can take place faster and more accurately.

Figure 4:
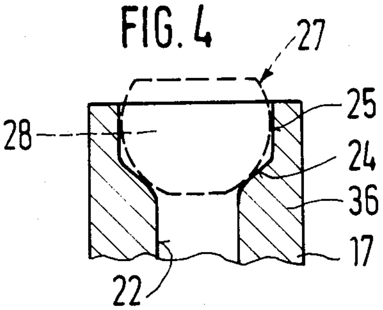
FIG. 4 shows a second exemplary embodiment of a valve seat body embodied according to the invention.

In the second exemplary embodiment of the invention shown in FIG. 4, the valve seat body 17 is shown in a side view, and the same reference numerals as before are used for elements having the same function as those in the earlier embodiments. The armature 27 and the guide section 28 are shown in broken lines. Differing from the embodiment of FIGS. 1–3, in the embodiment of FIG. 4 there are no depressions in the wall of the guide openinq 25 and stop openinq 24; instead, the wall of the stop openinq 24 is convex, so that even after a long period of operation on the part of the fuel injection valve, during which the guide section 28 strikes partway into the wall of the stop opening 24, the area of contact between the guide section 28 and the wall of the stop opening 24 is still smaller than in the case of the flat wall of the stop opening 24.

Figure 5:
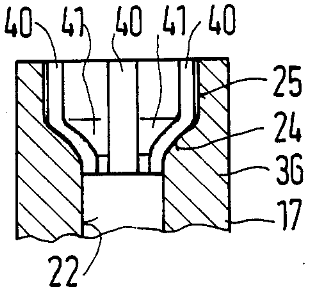
FIG. 5 shows a third exemplary embodiment of a valve seat body embodied according to the invention, seen in a side elevational view.
Figure 6:
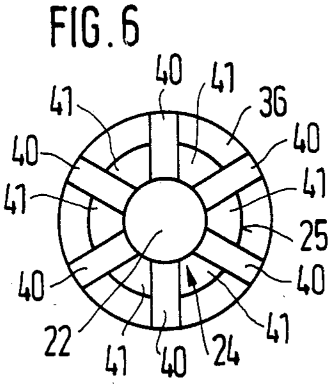
FIG. 6 is a plan view of the valve seat body of FIG. 5.

In the third exemplary embodiment of the invention, shown in FIGS. 5 and, elements that are the same as and function like those of the other embodiments are identified by the same reference numerals. The third embodiment shown in FIG. 5 and 6 is a combination of the characteristics of the exemplary embodiments of FIGS. 1–4. In this third embodiment, the wall of the stop opening 24 is convex, as in the second embodiment shown in FIG. 4, and qrooves 40 are orovided, as in the exemplary embodiment of FIGS. 1–3, which radially penetrate the wall of the valve seat body 17 in the vicinity of the guide bore 25 and are also machined, extending radially, into the wall of the stop opening 24.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuable fuel injection valve having a valve housing, a valve seat body disposed in the valve housing, at least one magnet coil, a core and an armature interposed between said housing and said valve seat body, said armature forming a portion of a guide section which carries a valve needle, said armature and said guide section having a shape of a portion of a sphere, the circumference of which is slidably supported in a guide bore of said valve seat body and a stroke movement of said guide section in a direction away from said core can be limited by means of a stop opening (24) including a wall which adjoins said guide bore and is arranged to taper progressively from said guide bore to a flow bore (22) and depressions (40) machined into said wall of said stop opening (24).

2. A fuel injection valve as defined by claim 1, in which the depressions are embodied as radially extending grooves (40) which are spaced apart approximately an equal distance from one another.

3. A fuel injection valve as defined by claim 2, in which the depressions (4) extend into the wall of the guide bore (25).

4. A fuel injection valve as defined by claim 3, in which the depressions (40) penetrate the wall of the valve seat body (17) radially in the vicinity of the guide bore (25).

5. A fuel injection valve as defined by claim 2, in which the wall of the stop opening (24) is conical relative to the guide bore (25).

6. A fuel injectinn valve as defined by claim 3, in which the wall of the stop opening (24) is conical relative to the guide bore (25).

7. A fuel injection valve as defined by claim 4, in which the wall of the stop opening (24) is conical relative to the guide bore (25).

8. A fuel injection valve as defined by claim 2, in which the wall of the stop openinc (24) is provided with a circular upwardly extending convex face that extends toward the guide bore (25).

9. A fuel injection valve as defined by claim 3, in which the wall of the stop opening (24) is provided with a circular uowardly extending convex face that extends toward the guide bore (25).

10. A fuel injection valve as defined by claim 4, in which the wall of the stop opening (24) is provided with a circular upwardly extendinc convex face that extends toward the guide bore (25).

11. An electromagnetically actuatable fuel injection valve having a valve housing, a valve seat body disposed in the valve housing, at least one magnet coil, a core and an armature interposed between said housing and said valve seat body, said armature forming a portion of a guide section which carries a valve needle, said armature and said guide section having a shape of a portion of a sphere, the circumference of which is slidably supported in a guide bore of said valve seat body and a stroke movement of said guide section in a direction away from said core can be limited by means of a stop opening (24) including a wall which adjoins said guide bore and is arranged to taper progressively from said guide bore to a flow bore (22) and wherein said wall of said stop opening (24) extends convexly toward said guide bore (25).

* * * * *